United States Patent
Soenen et al.

(10) Patent No.: US 7,426,821 B2
(45) Date of Patent: Sep. 23, 2008

(54) METAL STRAND COMPRISING INTERRUPTED FILAMENT

(75) Inventors: Paul Soenen, Kuurne (BE); Stijn Vancompernolle, Ghent (BE); Bert Vanderbeken, Waregem (BE)

(73) Assignee: NV Bekaert SA, Zwevegem (BG)

( * ) Notice: Subject to any disclaimer, the term of this patent is extended or adjusted under 35 U.S.C. 154(b) by 0 days.

(21) Appl. No.: 10/521,409

(22) PCT Filed: Jun. 26, 2003

(86) PCT No.: PCT/EP03/50268

§ 371 (c)(1),
(2), (4) Date: Jan. 18, 2005

(87) PCT Pub. No.: WO2004/007833

PCT Pub. Date: Jan. 22, 2004

(65) Prior Publication Data

US 2005/0257874 A1    Nov. 24, 2005

Related U.S. Application Data

(60) Provisional application No. 60/396,101, filed on Jul. 17, 2002.

(30) Foreign Application Priority Data

Jul. 22, 2002   (EP)   .................................. 02078180

(51) Int. Cl.
*D02G 3/02*   (2006.01)

(52) U.S. Cl. ...................................................... 57/236
(58) Field of Classification Search ................... 57/202; 156/47, 158, 166
See application file for complete search history.

(56) References Cited

U.S. PATENT DOCUMENTS

| | | | | |
|---|---|---|---|---|
| 3,908,715 A * | 9/1975 | Spiessens | .................... | 140/111 |
| 3,934,397 A * | 1/1976 | Black | .......................... | 57/202 |
| 4,191,009 A * | 3/1980 | Thomson | ...................... | 57/202 |
| 4,709,542 A | 12/1987 | Krafft | | |
| 4,724,929 A * | 2/1988 | Coleman et al. | ............ | 187/411 |
| 5,099,902 A * | 3/1992 | Shurman | ..................... | 152/540 |
| 5,337,548 A * | 8/1994 | Kelly | ............................ | 57/23 |
| 5,784,874 A * | 7/1998 | Bruyneel et al. | .............. | 57/237 |
| 6,313,409 B1 * | 11/2001 | Bales et al. | .............. | 174/128.1 |
| 6,321,810 B1 * | 11/2001 | Takahira | ..................... | 152/527 |
| 6,381,939 B1 * | 5/2002 | Brown et al. | .................. | 57/202 |
| 6,780,096 B1 * | 8/2004 | Brown et al. | ................ | 451/535 |
| 2005/0172605 A1 * | 8/2005 | Vancompernolle et al. | .... | 57/237 |
| 2006/0156534 A1 * | 7/2006 | Huang | ........................ | 29/527.2 |

\* cited by examiner

*Primary Examiner*—Shaun R Hurley
(74) *Attorney, Agent, or Firm*—Foley & Lardner LLP

(57) ABSTRACT

A metal strand comprising at least two filaments. At least one filament is interrupted, providing a filament end, which is fixed to the uninterrupted filaments of the strand using a fixing substance, preferably a soldering substance. Such strand can be used to provide, e.g. cords, rubber, or polymer reinforcement of tires and belts such as elevator or timing belts, hoisting or elevator ropes, control cables, or suspension rope.

29 Claims, 3 Drawing Sheets

METAL STRAND COMPRISING INTERRUPTED FILAMENT

FIELD OF THE INVENTION

The present invention relates to metal strands and cords and more in particular to maintain the workability of metal strands comprising filament ruptures present in the metal strand or cord.

BACKGROUND OF THE INVENTION

At present, it is a problem that during strand and cord construction, using e.g. double or single twisting operations, filaments of the strand or cord break. Most frequently, such ruptures cause two loose ends of filament, which projects out of the profile of the strand or cord.

The loose filament ends of the strand or cord may cause problems when the strand or cord is used during subsequent processes.

When such strand with projecting filaments is used to provide a multi-strand cord, these projecting filaments may cause process problems during cord production. The projecting ends may cause congestion in eyes, guiding parts or on small passages.

Due to this interaction between machinery parts and the filament ends, the broken or interrupted filament may "sleeve off". Over a large length of the strand, the filament is pulled out of the strand.

When strands as such or cords with projecting filaments are used, e.g. as control cables, these projecting filaments may cause disorder of the process in which it is used.

When such strand or cord with projecting filaments is used to provide polymer or rubber products (e.g. timing belts, elevator or hoisting belts), the projecting filaments may cause shearing or disfunctioning of the polymer or rubber matrix. Also here the projecting ends may cause congestion in guiding parts of e.g. extrusion machinery or other machines processing the strands or cords.

Therefor, such strands or cords with broken filaments or with filament ends projecting out of the profile of the strand or cord are avoided.

In order to avoid such projecting filaments, metal strands or cords, comprising such projecting filament ends, may be cut into two at the location of the projecting filament ends. As a result, a strand or cord with a length being the length of the strand or cord before the filament rupture is provided.

Either strand ends or cord ends may be welded one to another, providing a welded strand or cord with a relatively equal profile at the weld. This is hereafter referred to as "end-to-end welded" strands or cords. This solution does provide a strand or cord, which has inferior mechanical properties e.g. a lower force at rupture, a lower elasticity (strain at rupture), and higher bending stiffness and lower torsion ductility.

Although end-to-end welded metal strands can be used to provide cords, a sacrifice on mechanical properties of the metal cord is made.

SUMMARY OF THE INVENTION

It is a subject of the invention to provide a metal strand, comprising interrupted metal filaments, not having filament ends projecting out of the profile of the strand, but which can be processed, in spite of these filament ruptures, without the risk of sleeving off. The metal strand as subject of the invention preserves the mechanical properties of the metal strand to a large extent.

A metal strand as subject of the invention comprises at least two filaments, at least one filament is interrupted, providing at least one filament end. According to the present invention, this filament end is fixed to the uninterrupted filaments of the strand using a fixing substance. The place where the filament ends are fixed to the uninterrupted filaments of the strand is hereafter referred to as "fixation point".

Such filament interruptions may e.g. be caused by filament ruptures at the twisting points in the double or single twisting operations or by filament spools running empty or because of a rupture of the filament at the creel containing the filament spools.

It is understood that usually, although not necessarily, a filament interruption provides two filament ends, each being fixed to the uninterrupted filaments of the strand using a fixing substance, at a different fixation points.

In such case, a certain interruption zone length may be defined as the maximum strand length, comprising the two fixation points. Usually the two filament ends don't meet one another anymore at the ends. It is even so that most usually, the interruption zone has a length between several millimeters and several meters.

The fixing substance may be a glue or gluing paste, a polymer material, but preferably a soldering material. The solder is preferably provided using Ag, Sn or an alloy of Sn and Ag.

In case glue is used, metal-to-metal glue is preferred.

Temperature of the fixing substance during application, e.g. the melting temperature of the polymer or soldering material, is preferably lower than the transformation temperature of the metal alloy of the filaments, in order to preserve the mechanical and physical properties of the filaments. Most preferably, a temperature of less than 700° C., most preferably less than 350° C. is used. E.g. when steel is used, this transformation temperature is to be understood as the temperature above which the steel alloy transforms into an austenitic structure.

The fixation point preferably has a diameter, being less than 1.2 times the strand diameter or even more preferred, less than 1.1 times the strand diameter. The fixation point preferably has a diameter, being more than 0.8 times the strand diameter or even more preferred, more than 0.9 times the strand diameter. Most preferably, the fixation point is essentially equal to the strand diameter.

"Strand diameter" is defined as the diameter of the smallest circle encompassing a radial cross-section of the strand. The diameter at the location where the filament ends being fixed to the m filaments present in the interruption zone is the diameter of the smallest circle encompassing the location where the filament ends being fixed to the M filaments present in the interruption zone.

Preferably, the number of filament ends at each fixation point is less than 4, preferably less than 3 or less than 2. Most preferably only one filament end is present in each fixation point.

A metal strand as subject of the invention has as an advantage that the filament ends, being fixed to the uninterrupted metal filaments, don't disturb the use of such strands in further processes such as cabling processes or extrusion processes, e.g. by sleeving off.

Nor does the fixation of the filament ends at the ends of the interruption zone, provide an inflexible zone to the metal strand, as compared to the "end-to-end" welded strands. The metal strands as subject of the invention have also improved mechanical properties at the location where interrupted filaments are present, as compared to "end-to-end" welded strands.

Since preferably only a few or even one filament end is to be fixed at a fixation point, the strand is not weakened too much. The breaking load of the strand or cord, at the location of the interruption filament, approaches the sum of the breaking loads of the non-soldered metal filaments in the metal strand.

The force at rupture of a sample of the metal strand as subject of the invention is usually more than 50%, e.g. more than 60% or even more than 80% of the force at rupture of a sample of the metal strand without interrupted filaments. The elongation at rupture of a sample of the metal strand as subject of the invention is usually more than 30% e.g. more than 50 or even more than 60% of the elongation at rupture of a sample of the metal strand without interrupted filaments. Since usually high security factors for strand loads are used, the presence of a soldering zone on strand level does not cause any additional risk.

When strands as subject of the invention are used to provide polymer or rubber products (e.g. timing belts, elevator or hoisting belts), the risk on shearing or disfunctioning of the polymer or rubber matrix is removed, since no projecting filaments are present. Congestion in guiding parts of e.g. extrusion machinery or other machines processing the strands is no longer present.

"Strand" is to be understood as a number of metal filaments, being twisted with each other, resulting in a strand having an outer surface consisting of outer surface filaments. all outer surface filaments provide the outer surface of the strand. Possibly a core, also comprising metal filaments is provided to the strand. Such core has no filaments being present at the outer surface of the strand.

As en example, a strand comprises two layers of metal filaments, one layer providing a core and one layer providing the outer surface. Such strands are referred to as nxa+mxb-constructions, n and m being a number of filaments, whereas a and b referring to the filament diameter, expressed in mm. e.g. 1×0.19+6×0.175 or 1×0.21+6×0.19. Usually, in case n or m equals 1, n or m is not mentioned in the name of the product.

The core itself may also be provided as a layered construction of metal filaments. As an example, $n_1*a_1+n_2*a_2+m*b$ construction is mentioned, comprising a core of a two-layered $n_1*a_2+n_2*a_2$-construction, around which a third, outer layer of $m*b$ metal filaments is provided. $n_1$, $n_2$ and m represent the number of filaments, whereas $a_1$, $a_2$ and b are the respective diameters of the filaments, expressed in mm. As an example, 1*0.13+6*0.12+12*0.12 or 3*0.15+9*0.15+15*0.15 strands are mentioned.

The filament ends are fixed to the other uninterrupted filaments, either to one of the uninterrupted filaments, or to more than one of the uninterrupted filaments.

Metal strands as subject of the invention, preferably are provided out of steel alloys, most preferably out of carbon steels, having more than 0.275% C or more than 0.4% C or even more than 0.6% C, or stainless steel alloys.

Possibly the strand comprises metal filaments all of an identical filament diameter. However, usually the filaments of a strand as subject of the invention have different filament diameters. The diameters of the metal filaments are preferably less than 1.15 mm, e.g. less than 1.05 mm or less than 0.85 mm or even less than 0.7 mm, such as less than 0.5 mm, or less than 0.35 mm or even less than 0.25 mm, such as less than 0.21 mm. As an example, the diameter of the metal filaments are larger than 0.03 mm.

It is understood that a strand may comprise different filaments, which are of e.g. a different diameter, a different alloy or have a different coating.

The strands as subject of the invention have a strand diameter preferably less than 5 mm, e.g. less than 4 mm or less than 2.5 mm or even less than 1.75 mm, such as less than 1.4 mm, or less than 0.9 mm or even less than 0.7 mm, such as less than 0.6 mm or even less than 0.2 mm. The strand diameter is the diameter of the smallest imaginary circle, which encompasses the radial cross-section of the strand. As an example, the strand diameter is larger than 0.04 mm.

Further, according to the present invention, a metal cord obtainable by using at least one but preferably only one metal strand with filament ends being fixed to uninterrupted filaments as subject of the invention may be provided. Also, if during production of a metal cord, one or more filaments of one of the strands of the cord breaks, fixation of filament ends to the uninterrupted filaments of this strand using a fixation substance may be applied.

In both cases, a metal cord comprises at least one strand as subject of the invention, having filament ends being fixed to the uninterrupted filaments present in this strand.

A metal cord may have any cord construction comprising at least two strands, each comprising at least two metal filaments.

As an example, 'n×m-'constructions may be used, e.g. 3×3, 7×3, 4×7, 7×4, 7×7 or 7×19. n is to be understood as the number of strands in the cord, each strand having m filaments. It is understood that each strand may comprise different filaments, which are of e.g. a different diameter, a different alloy or have a different coating.

Also '$m_1+(n \times m_2)$-'constructions may preferably be used. Around a core strand of $m_1$ filaments, n strands of $m_2$ filaments are provided. An example is a 3+5×7-cord, being a cord comprising a core strand of 3 filaments, around which 5 strands of 7 filaments each are provided. The filaments $m_1$ and $m_2$ may be of the same or a different diameter.

It is understood that each strand may comprise different filaments, which are of e.g. a different diameter, a different alloy or have a different coating.

A metal cord has a cord diameter preferably less than 14 mm, e.g. less than 12 mm or less than 9 mm or even less than 7 mm, such as less than 5 mm, or less than 4 mm or even less than 2.5 mm, such as less than 2 mm or less than 1.7 mm, but may even be less than 0.25 mm. As an example, the cord diameter is larger than 0.10 mm.

"Cord diameter" is defined as the diameter of the smallest circle encompassing a radial cross-section of the cord. The diameter at the interruption zone is the diameter of the smallest circle encompassing the cross-section of the cord where the interruption zone of the strand as subject of the invention is present.

As the projecting filaments out of the profile of the cord may be avoided, the same benefits are obtained as for strands as subject of the invention. No projecting filament ends may cause process interruption or disturbance due to sleeving off, nor the mechanical properties of the cord are influenced to a large extent.

The force at rupture of a sample of the metal cord comprising a strand as subject of the invention is usually more than 75%, e.g. more than 80% or even more than 90% of the force at rupture of a sample of the metal cord without strand as subject of the invention. The elongation at rupture of a sample of the metal cord comprising a strand as subject of the invention is usually more than 30% e.g. more than 50 or even more than 60% or even more than 70% such as more than 80% of the elongation at rupture of a sample of the metal cord without strand as subject of the invention. Since usually high security factors for cord loads are used, the presence of a strand as subject of the invention on strand level does not cause any additional risk.

The elongation at rupture of a sample of the metal cord comprising an interruption zone is larger compared to the elongation at rupture of a sample of the metal cord being welded over the whole cross-section of the cord.

When a cord comprising a strand as subject of the invention is used to provide polymer or rubber products (e.g. timing belts, elevator or hoisting belts), the risk on shearing or disfunctioning of the polymer or rubber matrix is minimized. Congestion in guiding parts of e.g. extrusion machinery or other machines processing the cord is no longer present, meanwhile enjoying the improved mechanical properties.

Therefor metal cord, as well as metal strands, as subject of the invention may e.g. be used to reinforce polymer or rubber belts, such as timing belts, elevator or hoisting belts, conveyor belts, or can be used for control cables, elevator or hoisting rope, suspension rope or several automotive applications such as tire reinforcement or window elevator cable.

Since the strands or cords, comprising a strand as subject of the invention, overcomes the presently known technical drawbacks, the strand or cord manufacturer is also able to reduce the waste-level, and the strand or cords can be provided in a more economical way. This since also a drawback is faced by these manufacturers, being obliged at present to provide strands or cords not having filament ruptures over its whole length.

BRIEF DESCRIPTION OF THE DRAWINGS

The invention will now be described into more detail with reference to the accompanying drawings wherein.

DESCRIPTION OF THE PREFERRED EMBODIMENTS OF THE INVENTION

Figure 1:
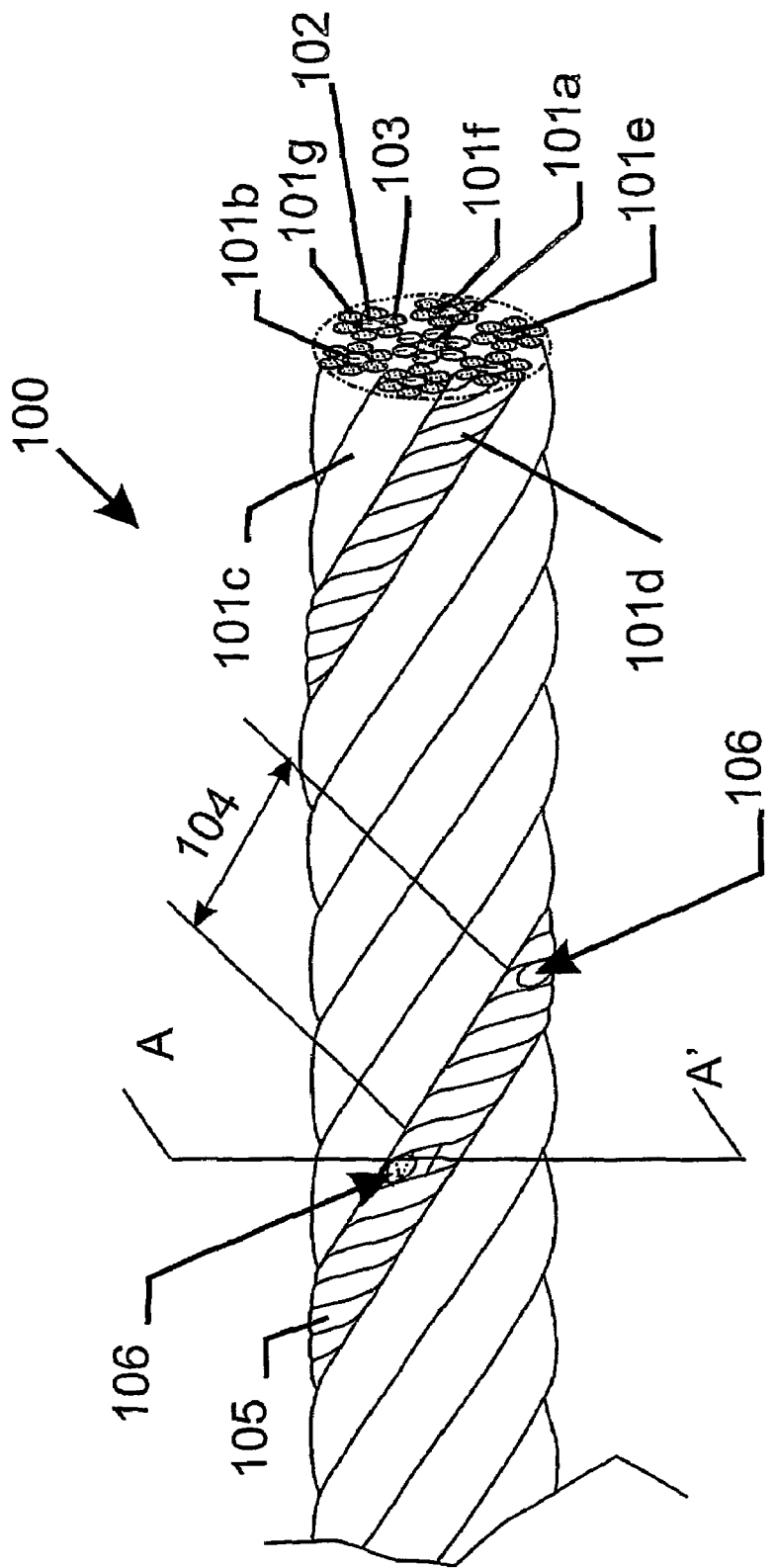
FIG. 1 is a schematic view of a cord and a strand as subject of the invention.

An embodiment of a metal cord and a metal strand as subject of the invention is shown in FIG. 1. A metal cord 100, provided out of steel having 0.7% C, having a construction "(0.21+6×0.19)+6×(0.19+6×0.175)". The cord comprises 7 strands (101*a*, 101*b*, 101*c*, 101*d*, 101*e*, 101*f* and 101*g*). each strand comprises a core filament 102 and filaments 103 providing the outer layer of the strand.

The core strand 101*a* comprising a core filament 102 of diameter 0.21 mm, being encircled by 6 filaments 103 of a diameter 0.19 mm. The other outer strands 101*b*, 101*c*, 101*d*, 101*e*, 101*f* and 101*g* having all a core filament 102 of diameter 0.19 mm, and 6 encircling filaments 103 of 0.175 mm.

The core strand 101*a* has a lay length of 6.3 mm and the outer strands 101*b*, 101*c*, 101*d*, 101*e*, 101*f* and 101*g* having all a lay length 104 of 8 mm. The core strand 101*a* and the metal cord itself are twisted in the same direction (S or Z direction) whereas the strands 101*b*, 101*c*, 101*d*, 101*e*, 101*f* and 101*g* all being twined in the opposite direction (Z, respectively S).

Figure 2A:
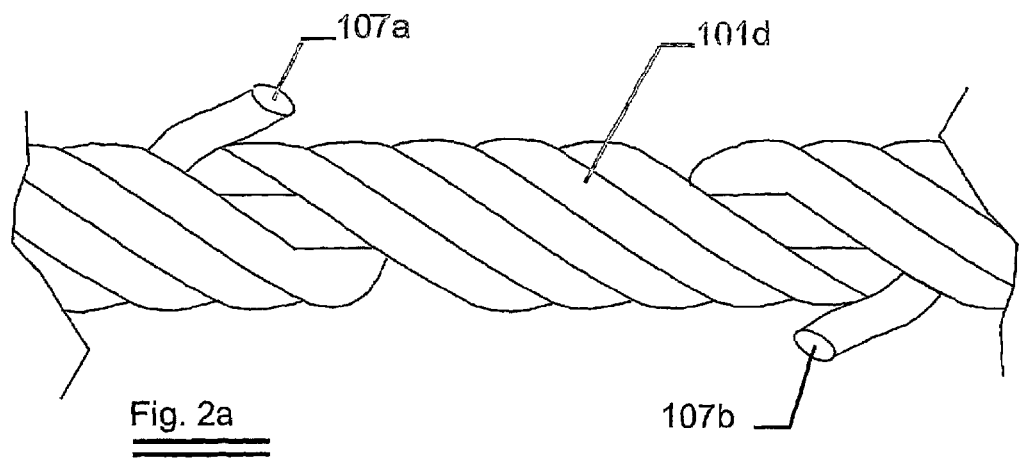
FIG. 2*a* is a schematic view of a strand having a filament rupture.
Figure 2B:
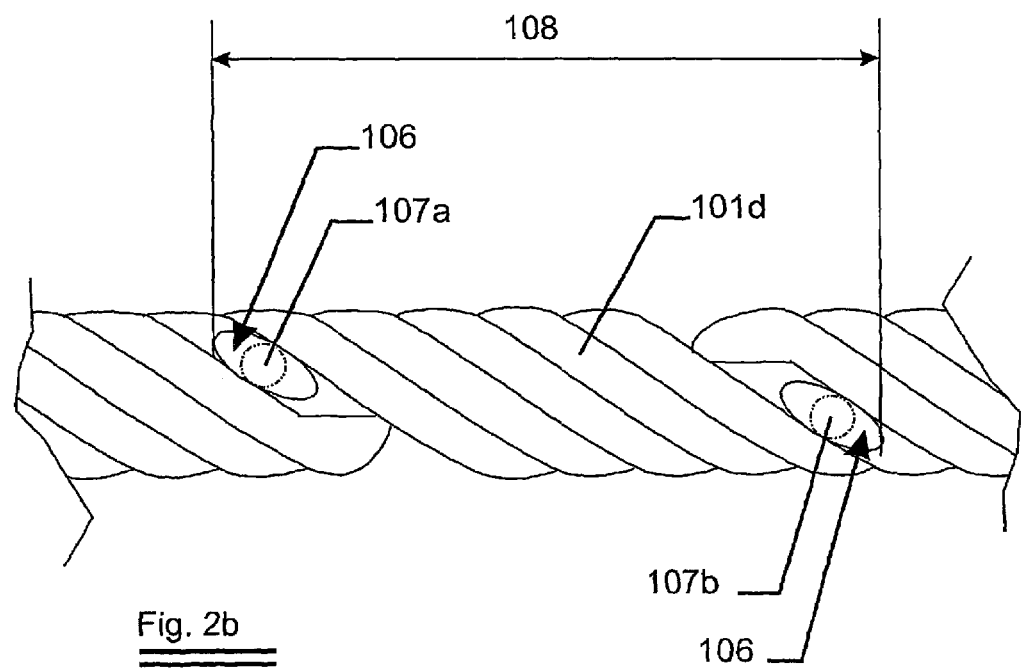
FIG. 2*b* is a schematic view of the strand of FIG. 2*a*, of which the filament ends are fixed according to the invention.

As shown in FIG. 2*a* and FIG. 2*b*, the strand 101*d* has one filament 105 being interrupted. The metal filament 105 is a filament of the outer layer of strand 101*d*. This rupture provides two filament ends 107*a* and 107*b* projecting out of the strand profile as shown in FIG. 2*a*.

According to the present invention, both ends 107*a* and 107*b* are fixed, preferably soldered, too the uninterrupted filaments of the strand 101*d* providing two fixation points 106, as shown in FIG. 2*b*. The interruption zone of the strand 101*d* has a length as indicated with arrow 108. The interruption zone has one filament less, so 6 filaments remain uninterrupted in the present example.

As fixing substance, preferably soldering substance chosen out of the group consisting of Ag, Sn or Ag—Sn alloys is used. Most preferably Sn—Ag alloy is used.

Figure 3:
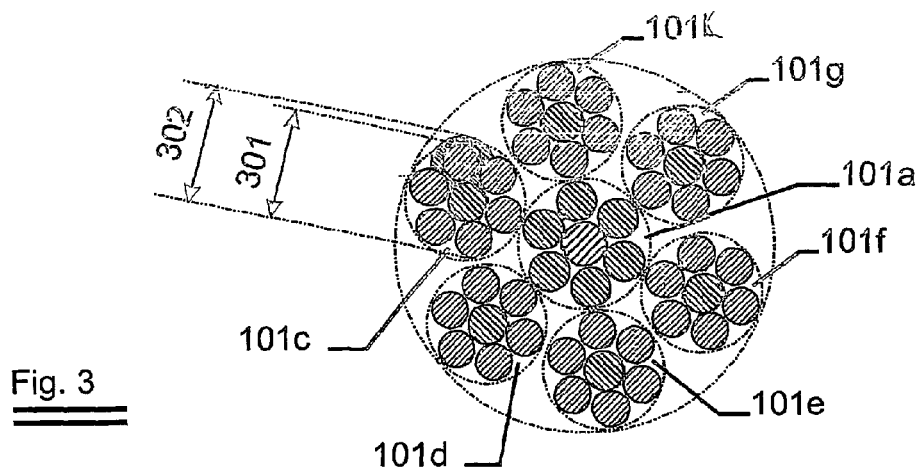
FIG. 3 is a radial cut according to the plane AA' of the cord of FIG. 1.

As indicated in FIG. 3, being a section according to AA' of FIG. 1, one notices that the diameter of the strand 101*d*, indicated 301, is essentially equal to the diameter of the location of the fixation points 106 at each side of the interruption zone, as indicated with 302.

The force at rupture and the elongation at rupture of the strand 101*d* and of the cord 100 are given in Table I.

TABLE I

| sample | Force at rupture (Mpa) | Elongation at rupture (%) |
| --- | --- | --- |
| Strand 101d | | |
| Sample 1 | 396.9 | 1.24 |
| Sample 2 | 415.6 | 1.36 |
| Sample 3 | 420.2 | 1.52 |
| Sample 4 | 419.4 | 1.38 |
| Sample 5 | 418.2 | 1.43 |
| Reference without soldered zone | 488 | 2.05 |
| Cord 100 | | |
| Sample 1 | 3081.5 | 2.46 |
| Sample 2 | 3077.5 | 2.39 |
| Sample 3 | 3033.6 | 2.16 |
| Sample 4 | 3020.2 | 2.16 |
| Sample 5 | 3018.7 | 2.18 |
| Sample 6 | 3078.9 | 2.37 |
| Reference without soldered zone | 3200 | 2.75 |

For all samples, an Ag—Sn alloy soldering substance was used.

All tests are done on a sample of 1000 mm of strand or cord.

As one notice, the average force at rupture of the strands with interruption zone is 85% of the force at rupture of the reference strand without interruption zone. The average elongation at rupture is 68% of the elongation at rupture of the reference strand without interruption zone.

The average force at rupture of the cord comprising a strand with interruption zone is 95% of the force at rupture of the reference cord comprising strands without interruption zone. The average elongation at rupture is 82% of the elongation at rupture of the reference cord comprising strands without interruption zone.

Figure 4:
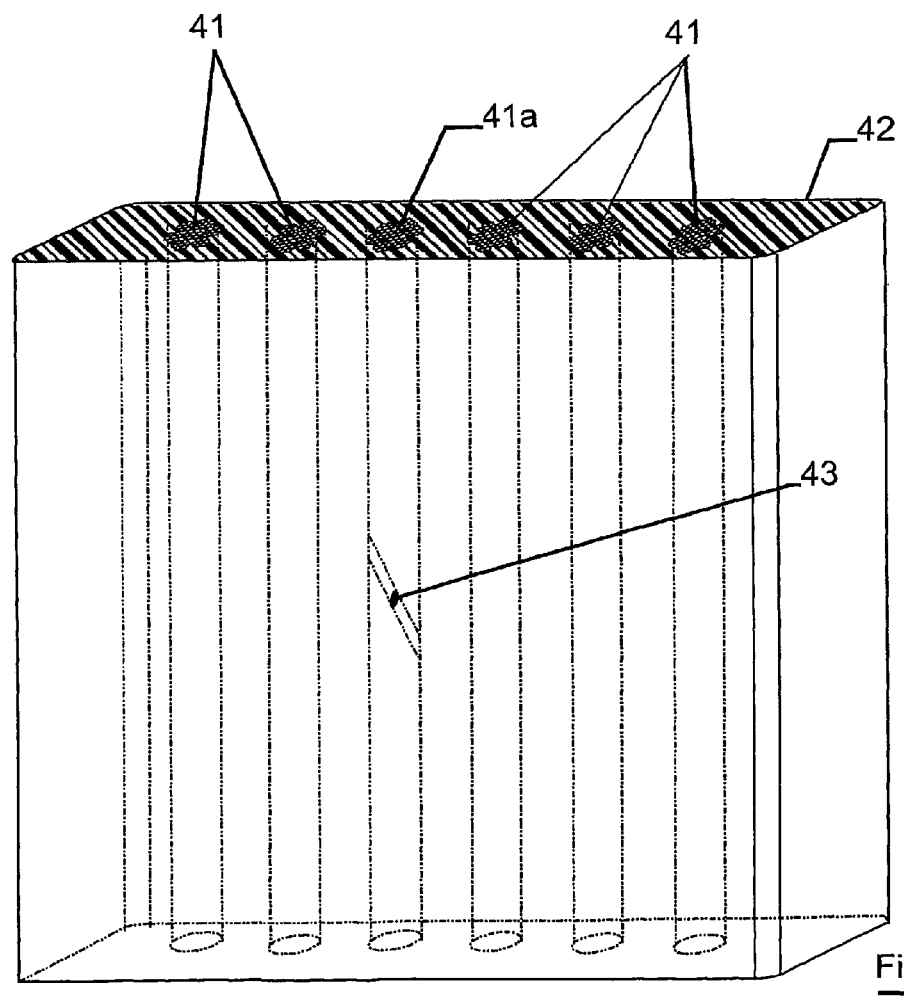
FIG. 4 is a polymer belt comprising a cord as subject of the invention.

As shown in FIG. 4, metal cords 41 are embedded in a polyurethane matrix 42. The metal cord 41*a* as subjects of the invention has a strand with a soldered zone 43. Such belt can be used as elevator belt.

The invention claimed is:

1. A metal strand, comprising: at least two filaments, wherein at least one filament is interrupted to provide at least one filament end, wherein said one filament end is fixed to a second filament of said strand using a fixing substance, wherein the second filament is uninterrupted, wherein said strand having an interruption zone, at each side of said interruption zone, at least one filament end being fixed to said uninterrupted filament, and wherein the strand at the interruption zone has a force at rupture of more than 50% of the force at rupture of said strand outside said interruption zone.

2. A metal strand according to claim 1, said fixing substance being a glue.

3. A metal strand according to claim 1, said fixing substance being a polymer.

4. A metal strand according to claim 1, said fixing substance being a soldering substance.

5. A metal strand according to claim 4, said soldering substance having a melting temperature lower than 700° C.

6. A metal strand according to claim 4, said soldering substance being chosen out of the group consisting of Ag, Sn or Ag-Sn alloys.

7. A metal strand according to claim 1, wherein only one filament is interrupted.

8. A metal strand according to claim 1, said strand having a strand diameter, a diameter of fixation of filament ends being essentially equal to said strand diameter.

9. A metal strand according to claim 1, wherein the strand diameter is smaller than 5 mm.

10. A metal strand according to claim 1, wherein the strand diameter is smaller than 2.5 mm.

11. A metal strand according to claim 1, wherein said filaments have a filament diameter, said filament diameter being smaller than 1.15 mm.

12. A metal strand according to claim 1, wherein the filament diameter is smaller than 0.35 mm.

13. A metal strand according to claim 1, wherein the strand at the interruption zone has an elongation at rupture of more than 30% of the elongation at rupture of said strand outside said interruption zone.

14. A metal strand according to claim 1, said metal being steel.

15. A metal cord comprising at least two metal strands, at least one of said strands being a metal strand as in claim 1.

16. A reinforced polymer, comprising the metal strand according to claim 1.

17. A reinforced polymer as claimed in claim 16, wherein said reinforced polymer is an elevator belt.

18. A reinforced polymer as claimed in claim 16, wherein said reinforced polymer is a timing belt.

19. A reinforced polymer as claimed in claim 16, wherein said reinforced polymer is a hoisting rope.

20. A reinforced polymer as claimed in claim 16, wherein said reinforced polymer is a control cable.

21. A reinforced polymer as claimed in claim 16, wherein said reinforced polymer is a suspension rope.

22. A metal strand according to claim 1, wherein the fixing substance is disposed at the end of the filament end.

23. A metal strand according to claim 1, wherein at least one filament serves as a core filament and at least one other filament serves as a filament that encircles that at least one core filament.

24. A metal strand according to claim 1, wherein the interruption zone is formed by two filament ends that are spaced apart from one another to form an interruption zone with a length corresponding to the distance between the spaced apart filament ends.

25. A metal strand according to claim 24, wherein the two filament ends are formed from a single filament.

26. A reinforced polymer as claimed in claim 16, wherein said reinforced polymer is a reinforced rubber belt.

27. A reinforced polymer as claimed in claim 16, wherein said reinforced polymer is a reinforced tire.

28. A reinforced polymer as claimed in claim 16, wherein said reinforced polymer is a hoisting belt.

29. A reinforced polymer as claimed in claim 16, wherein said reinforced polymer is an elevator rope.

* * * * *